(12) United States Patent
Hussain et al.

(10) Patent No.: US 12,541,448 B2
(45) Date of Patent: Feb. 3, 2026

(54) EXTENSIBLE RESOURCE COMPLIANCE MANAGEMENT

(71) Applicant: Amazon Technologies, Inc., Seattle, WA (US)

(72) Inventors: Amjad Hussain, Bellevue, WA (US); Ananth Vaidyanathan, Seattle, WA (US); Sivaprasad Venkata Padisetty, Bellevue, WA (US); Xiong Wang, Redmond, WA (US); Anand Doshi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 17/665,260

(22) Filed: Feb. 4, 2022

(65) Prior Publication Data

US 2022/0229657 A1   Jul. 21, 2022

Related U.S. Application Data

(63) Continuation of application No. 15/676,908, filed on Aug. 14, 2017, now Pat. No. 11,243,756.

(51) Int. Cl.
   *G06F 11/3604* (2025.01)

(52) U.S. Cl.
   CPC .............................. *G06F 11/3612* (2013.01)

(58) Field of Classification Search
   CPC ... G06F 8/60; G06F 8/65; G06F 8/656; G06F 9/452; G06F 9/455; G06F 17/30958; G06F 17/30979; G06F 21/121; G06F 21/45; G06F 21/57; G06F 16/90335; H04L 41/082; H04L 41/20; H04L 41/28; H04L 41/5096; H04L 69/40; H04L 63/0823; H04L 63/10; H04L 63/101; H04L 63/104; H04L 63/20; H04L 67/02; H04L 67/10; H04L 67/12; H04L 67/26; H04L 67/306; H04L 41/0866; H04L 41/0895; H04L 41/142; H04L 41/40; H04L 63/205; G06N 5/022; H06L 43/028; H06L 43/065; H06L 43/0817; H06L 43/0876; H06L 43/20
   USPC ......................................... 717/168, 120–135
   See application file for complete search history.

(56) References Cited

U.S. PATENT DOCUMENTS

| | | | |
|---|---|---|---|
| 9,392,022 B2 | 7/2016 | Frascadore et al. | |
| 9,553,887 B2 | 1/2017 | Thakkar et al. | |
| 10,484,429 B1* | 11/2019 | Fawcett | H04L 63/20 |
| 11,243,756 B1 | 2/2022 | Hussain et al. | |
| 2013/0047147 A1 | 2/2013 | McNeill | |
| 2014/0331277 A1* | 11/2014 | Frascadore et al. | H04L 63/20 726/1 |
| 2016/0147518 A1 | 5/2016 | Dimitrakos et al. | |
| 2016/0308912 A1* | 10/2016 | Mulgaonkar et al. | H04L 41/28 |
| 2017/0177324 A1 | 6/2017 | Frank et al. | |

(Continued)

*Primary Examiner* — Qing Chen
(74) *Attorney, Agent, or Firm* — S. Scott Foster; Kowert, Hood, Munyon, Rankin & Goetzel, P.C.

(57) ABSTRACT

Compliance schemes may be associated with compliance types to provide resource compliance management. Compliance types may be created and associated with different compliance schemes. Compliance state for the compliance types may be generated and provided in response to requests to access the compliance state. Queries for compliance state, for example, may request compliance state, and query predicates or other criteria may be applied to the compliance state in order to perform the query.

20 Claims, 10 Drawing Sheets

(56) References Cited

U.S. PATENT DOCUMENTS

2018/0034703 A1* 2/2018 Anholt .................... H04L 67/51
2018/0374047 A1* 12/2018 Sarkar ................... G06F 16/248

* cited by examiner

EXTENSIBLE RESOURCE COMPLIANCE MANAGEMENT

This application is a continuation of U.S. patent application Ser. No. 15/676,908, filed Aug. 14, 2017, which is hereby incorporated by reference herein in its entirety.

BACKGROUND

Complex systems include many different resources accountable to different configurations, states, or conditions in order to properly perform different tasks, operations, or services. Compliance management systems provide assessment tools in order to identify those resources that fail to conform to a desired configuration, state, or condition. In order to quickly remedy non-conforming resources, efficient techniques for identifying the compliance state of individual resources and collections of resources may be highly desirable.

Figure 1:
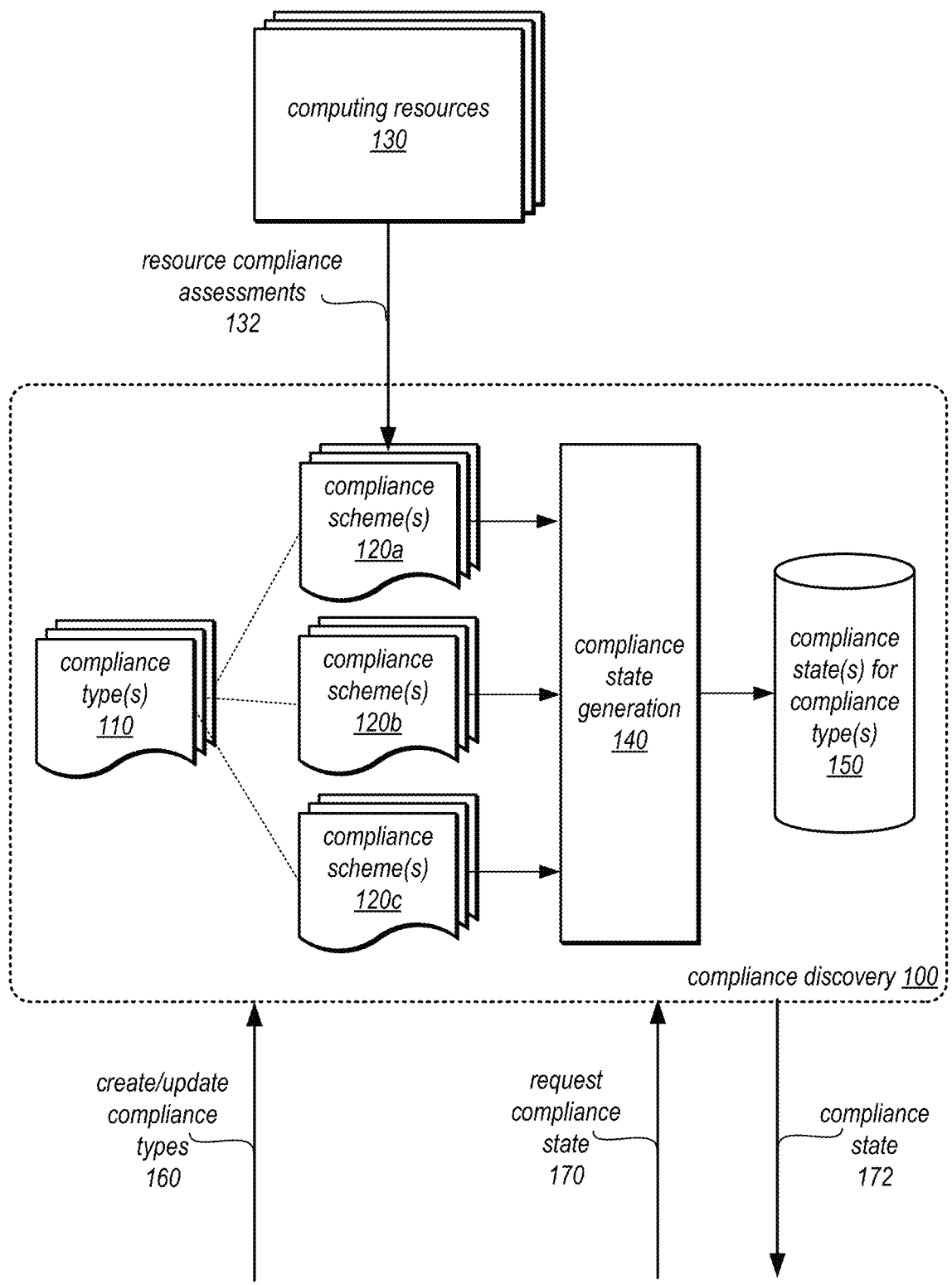
FIG. 1 illustrates a logical block diagram of extensible resource compliance management, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of extensible resource compliance management are described herein. Large sets of computing resources operating across diverse systems or platforms need to be maintained in various states, configurations, or other conditions in order to provide safe, secure, or optimal performance, in various embodiments. In order to ensure that the computing resources are maintained in the desired states, configurations, or other conditions, compliance schemes may be applied to define the states, configurations, or other conditions of computing resources which should be implemented, in some embodiments. For example, checks, assessments, audits, or other evaluations may be performed for resources with respect to compliance schemes in order to determine whether resources satisfy the desired state, configuration, or other resources conditions, in some embodiments.

Because different compliance schemes may be managed and applied for different types of compliance assessments, checks or evaluations, compliance types may be implemented in various embodiments to aggregate different compliance schemes for diverse resources under an associated compliance type to provide both high level compliance state information, without losing access to more detailed compliance state information in response to requests for resource compliance data, in some embodiments. Moreover, because new compliance types can be created and associated with compliance schemes, resource compliance assessment can be extended to capture new assessment mechanisms and resources, or organize and collect compliance data for different views, in various embodiments. For example, a compliance type may be created that associates compliance data for multiple different user accounts of a provider network, like provider network 200 discussed below with regard to FIGS. 2-7, in some embodiments.

FIG. 1 illustrates a logical block diagram of extensible resource compliance management, according to some embodiments. Compliance discovery 100 or other compliance management systems, such as compliance management service 270 discussed below with regard to FIGS. 2-7, may implement compliance type(s) 110, in some embodiments. Compliance type(s) 110 may associate one or multiple compliance scheme(s), such as compliance scheme(s) 120*a*, 120*b*, and/or 120*c* with a compliance type 110, so that compliance state for various compliance schemes can be evaluated by accessing the compliance state for compliance type(s) 150, in various embodiments.

Compliance scheme(s) 120 may identify a desired state, configuration, or condition of computing resources 130. Computing resources 130 may be any physical or virtual hardware and/or software for which different compliance schemes 120 may be applied. For example, virtualized computers or services implemented on physical host servers may be computing resources for which compliance schemes 120 may be applied. In some embodiments, computing resources 130 may include services or configurations applicable to a collection of computing resources, including physical or virtualized networking devices, like load balancers or other request routers, network isolation or security protocols, such as virtual private networking, or resource management services, like automated resource scaling. Different compliance schemes may be differently applied and/or assessed with respect to different computing resources. For instance, software update compliance schemes may be assessed differently than network configurations of computing resources, in some embodiments.

Compliance types 110 may be associated with compliance schemes 120 so that compliance state 150 may be generated for the compliance type (e.g., as opposed to an individual compliance scheme). In this way, requests for compliance state 170 and provided compliance state 172 may be more easily managed and accessed, in some embodiments. For example, different access restrictions and roles may be assigned to different compliance types in order to allow some users with greater access to more detailed compliance information. Alternatively, in another example embodiment, compliance types may associate the compliance schemes applied to resources in a geographic region (e.g., Europe, North America, etc.) in order to aggregate compliance state across the geographic region. In some embodiments, compliance types 110 may be created or updated 160 in order to customize the state information that can be provided for requests 170 (e.g., for particular types of users or processing, such as security audits, information technology support, etc.).

Compliance state generation 140 may be performed as compliance assessments 132 for different compliance scheme(s) 120 are received, in order to provide compliance state for different compliance types, in some embodiments. For example, compliance state generation 140 may extract compliance results from the compliance assessments of individual resources and analyze the individual results to generate a combined compliance state 150 for resources accountable to multiple and/or different compliance schemes associated with the compliance type according to a schema for the compliance type, as discussed below with regard to FIGS. 8 and 9.

Please note that the previous description of extensible resource compliance management is a logical illustration and thus is not to be construed as limiting as to the implementation of a compliance types, compliance schemes, computing resources, or compliance state generation.

This specification begins with a general description of a provider network that implements a compliance management service that provides extensible resource compliance management. Then various examples of a compliance management service including different components/modules, or arrangements of components/module that may be employed as part of implementing the services are discussed. A number of different methods and techniques to implement extensible resource compliance management are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
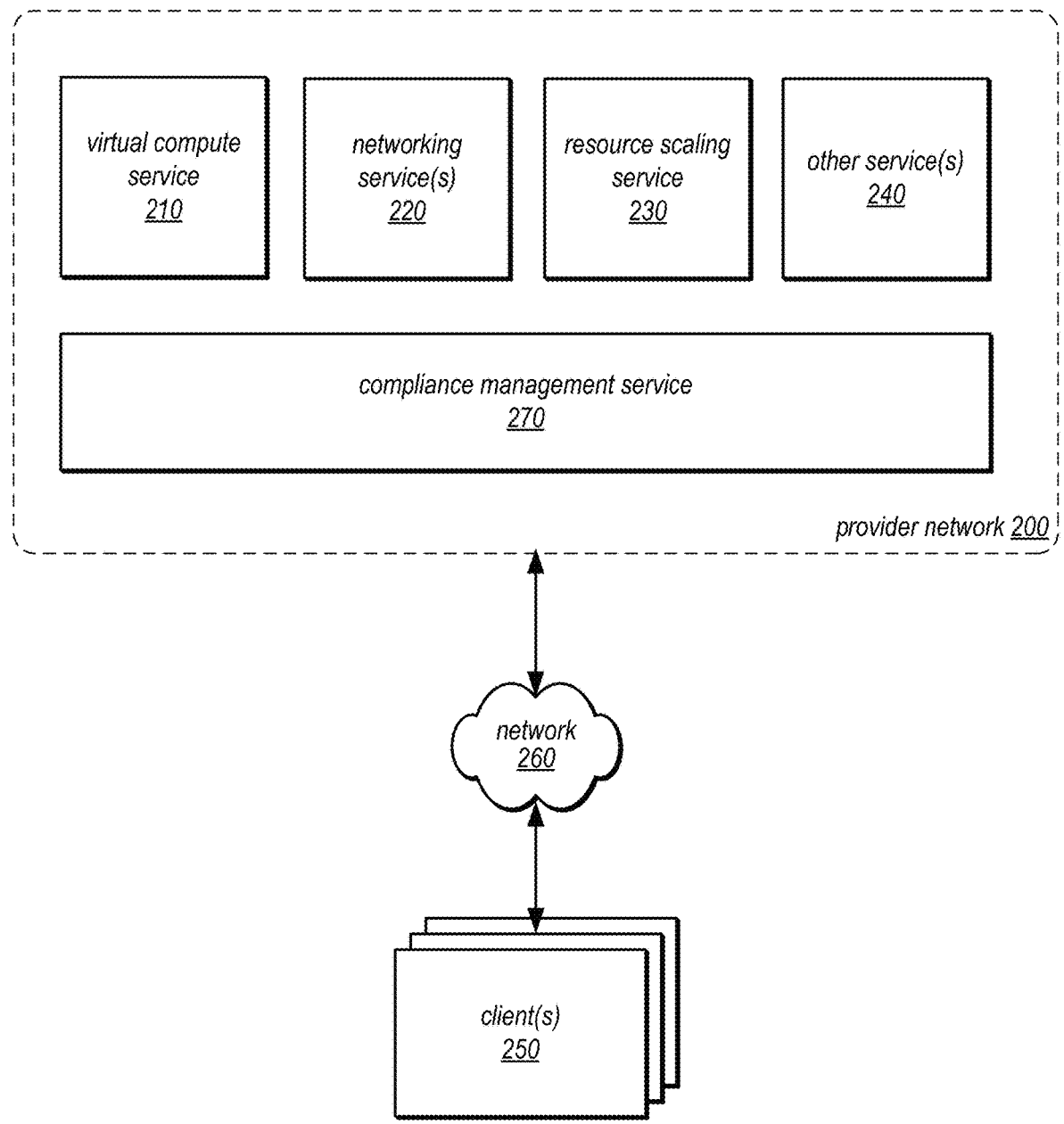
FIG. 2 is a logical block diagram illustrating a provider network offering a compliance management service for resources hosted in the provider network, according to some embodiments.

FIG. 2 is a logical block diagram illustrating a provider network offering a compliance management service for resources hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure, storage, and other computing resource services offered by the provider network 200. In some embodiments, provider network 200 may implement various computing resources or services, such as a virtual compute service 210, networking service(s) 220, resource scaling service 230, compliance management service 270 and other services, which may include data processing service(s), (e.g., relational or non-relational (NoSQL) database query engines, map reduce processing, data flow processing, and/or other large scale data processing techniques), data storage service(s), (e.g., an object storage service, block-based storage service, or data storage service that may store different types of data for centralized access), and/or other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of compliance management service 270) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Compute instance configurations may include security policies, network port configuration, or any other configuration of the virtual compute instance (or underlying hardware of the host Networking service(s) 220 may include various kinds of network traffic control services, such as virtual load balancing resources, in some embodiments. For example, a load balancing service may automatically distribute incoming traffic across multiple computing resources, such as compute instances. The load balancing service may provide fault tolerance for applications executing on computing resources and may provide the required amount of load balancing capacity needed to route application traffic, in some embodiments. For example, the load balancing service may detect unhealthy resources and reroute traffic across the remaining healthy resources. The load balancing service may automatically scale load balancer request handling capacity to meet the demands of traffic, in some embodiments.

Networking service(s) 220 may also include various kinds of network security services. For example, a network security service may allow users to provision a logically isolated section of the provider network 200 where a user can launch computing resources in a virtual network that is user-defined. The network security service may provide controls for a user to manage the networking environment of the network, such as controls to select an Internet Protocol (IP) address range, create subnets, and configure route tables and network gateways, in some embodiments. The network security service may allow a user to different protocols, such as IPv4 and IPv6, access resources in the virtual private network. For example, a user can create a public-facing subnet for computing resources acting as webservers that has access to a public network like the Internet, and place backend systems such as databases or application servers in a private-facing subnet with no Internet access. The network security service may allow users to implement multiple layers of security, including security groups and network access control lists, to help control access to computing resources in each subnet. Compliance schemes may include various conditions, states, or configurations enforced or applied by resources in networking service(s) 220.

Resource scaling service 230 may maintain application or other resource availability for provider network 200 resources, allowing dynamic scaling of resources, such as virtual compute instances, scaling capacity up or down automatically according to defined conditions, in some embodiments. Resource scaling service 230 may ensure the health and availability of collections of resources implementing various services or applications, by launching and running a desired number of resources, in some embodiments. Resource scaling service 230 may automatically increase the number of resources during demand spikes to maintain performance and decrease capacity during lulls to reduce costs, in some embodiments. Compliance schemes may include various conditions, states, or configurations enforced or applied by or to resources in resource scaling service 230.

Compliance management service 270, as discussed in detail below with regard to FIGS. 3-7, may allow users to create compliance schemes for different types of compliance assessors to enforce or evaluate, different compliance types to associate with compliance schemes, generate compliance state for the compliance type, and provide access to the generated compliance state.

Generally speaking, clients 250 may encompass any type of client configurable to submit network-based requests to provider network 200 via network 260, including requests for compliance management service 270 (e.g., to create a compliance type, etc.). For example, a given client 250 may include a suitable version of a web browser, or may include a plug-in module or other type of code module that may execute as an extension to or within an execution environment provided by a web browser. Alternatively, a client 250 may encompass an application such as a compliance evaluation application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service of provider network 200. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests (e.g., compliance type creation requests for compliance management service 270) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
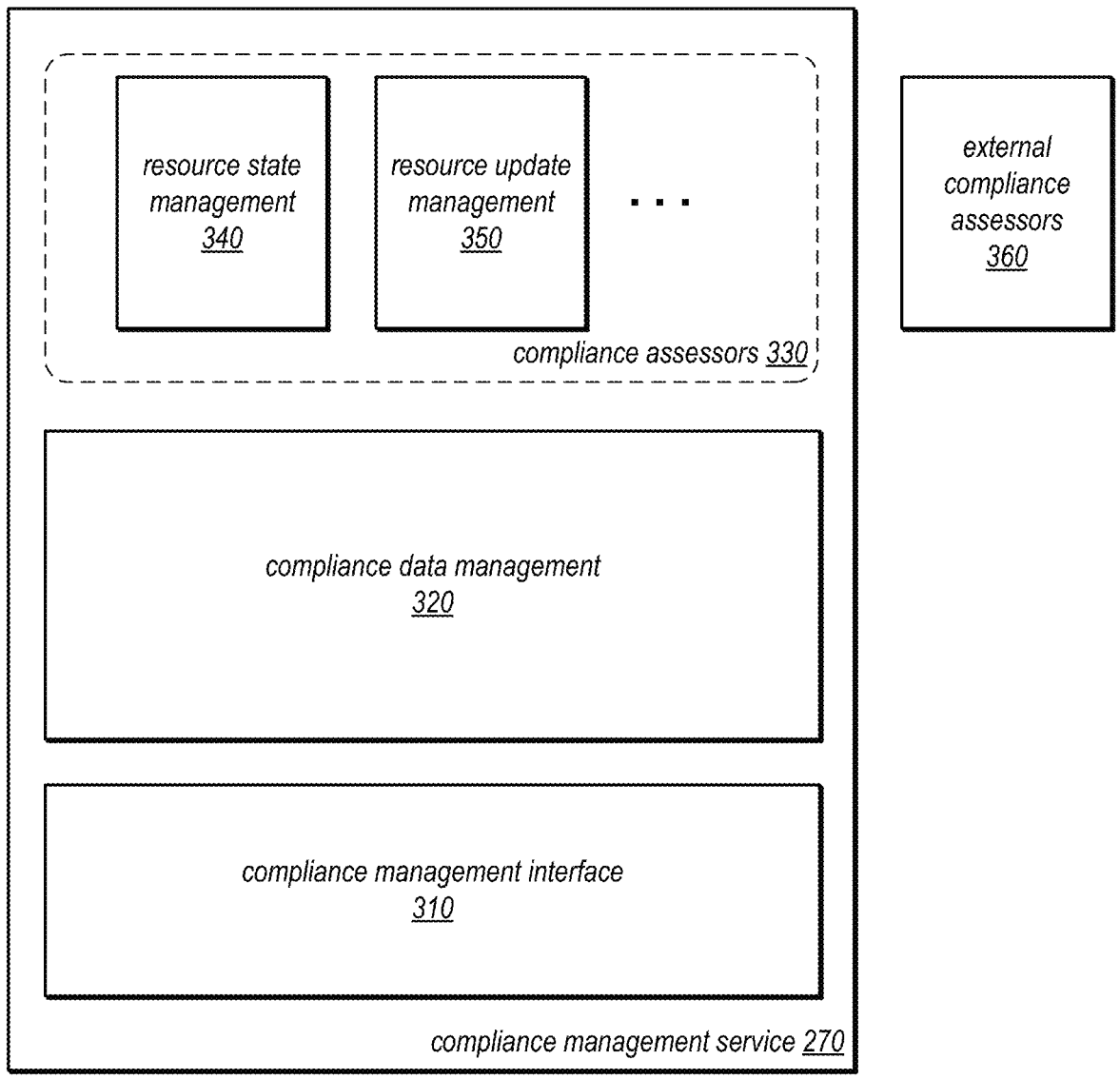
FIG. 3 is a logical block diagram illustrating a compliance management service that provides extensible resource compliance management, according to some embodiments.

FIG. 3 is a logical block diagram illustrating a compliance management service that provides extensible resource compliance management, according to some embodiments. Compliance management service 270 may implement (or interact with) various compliance assessors 330 to perform compliance assessment for resources in provider network 200. For example, in some embodiments, compliance assessors 330 may include resource state management 340. Resource state management 340 may automate the process of keeping computing resources, such as virtual compute instances from virtual compute service 210, and other infrastructure in a user-defined state. Resource state management 340 may enforce and perform compliance assessment on the state of computing resources to ensure that the computing resources are, for example, bootstrapped with specific software at startup, configured according to a specific security policy, or joined to a particular domain. Resource state management 340 can execute or perform configuration operations, including performing scripts or executables for various kinds of operations systems or other software executing on computing resources at different times during the lifecycle of a resource.

Resource state management 340 may apply compliance schemes in order to enforce and apply a user-defined state to identified computing resources (for example, applications to bootstrap or network settings to configure) using different configuration mechanisms, such as by executing system manager commands or applying a policy document. Compliance schemes may be written in human-readable formats, such as JavaScript Object Notation (JSON), and stored as documents, in some embodiments. The documents may be bound to target computing resources by using various service interfaces, such as a command line interface or console interface for virtual compute service 210, in some embodiments. Once a resource is bound to a document, the resource may remain in the state that enforced by the document because resource state management 340 performs compliance assessment an may reapply in order to remediate non-compliant resources, in some embodiments.

Another example compliance assessor 330 may be resource update management 350, in some embodiments. Resource update management 350 may provide an automation-focused patching (or other software update) service which allow users to keep software installations performing on computing resources, such as operating systems, applications, support applications, drivers, or other software. Resource update management 350 may streamline an updates process by scheduling and installing updates according to maintenance windows and leveraging dynamic update approval policies, in some embodiments. Resource update management 350 may implement compliance schemes, such as update baselines, which may define the set of updates approved or blocked for deployment to computing resources. In an update baseline, individual updates may be selected or identified according to the type or version of software operating on computing resources, such as operating system versions, application versions, etc., categories of updates, such as critical updates, security updates, etc., and update severities or importance scores for which updates may need review or approval prior to installation, in some embodiments. For each category selected, in some embodiments, a schedule can be defined on which the updates included within the category may be automatically approved for installation. Compliance schemes may also include a whitelist and blacklist of updates which indicate updates which are to be installed or blocked respectively, in some embodiments. At the time of update installation, resource update management 350 may assess targeted resources for only the updates that have been approved prior to that point in time of installation, in some embodiments.

In some embodiments, external compliance assessors 360 may be implemented (e.g., at third party or external resources, such as on premise computing resources or other provider networks) or within other services of provider network 200. For example, different compliance assessors may be developed for networking service(s) 220 or resource scaling service 230 to ensure that the virtual networking and scaling resources performed by the respective services compliance with a configuration, state, or other set of criteria that may be desired by a user, in some embodiments. External compliance assessors 360 may define the compliance schemes for such other resources and report the compliance information to compliance management service 270 for inclusion in compliance state generation. In this way, compliance management service 270 may act as a centralized repository for accessing compliance state of resources across provider network 200 and external to provider network 200, in some embodiments. For example, filters or other search criteria applied to compliance type state (as discussed below) may be used to retrieve compliance information for external resources from compliance management service 270 even though compliance management service 270 is implemented within provider network 200.

Compliance management service 270 may implement compliance management interface 310, as discussed in detail below with regard to FIG. 4, to handle requests to compliance management service 270. Compliance management service 270 may implement compliance data management 320 to manage compliance types and the generation of compliance state generated for associated compliance schemes assessed by compliance assessors 330 and external compliance assessors 360, in some embodiments, as discussed in detail below with regard to FIG. 7.

Figure 4:
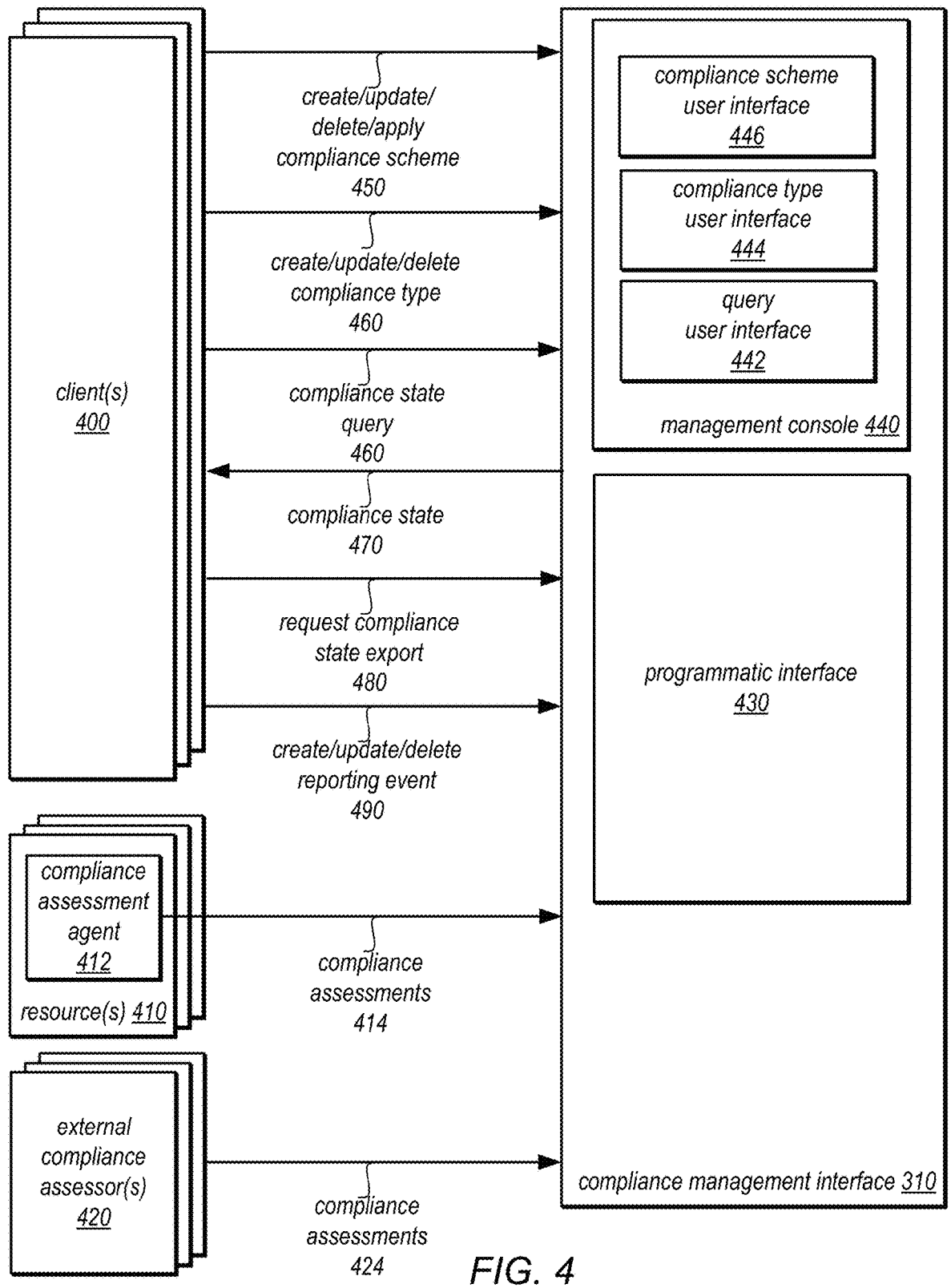
FIG. 4 is a logical block diagram illustrating interactions with an interface of a compliance management service, according to some embodiments.

FIG. 4 is a logical block diagram illustrating interactions with an interface of a compliance management service, according to some embodiments. Compliance management interface 310 may provide a common interface which different compliance types and schemes can be managed and the results of such compliance types and schemes accessed, in some embodiments. For example, client(s) 400 (which may be similar to client(s) 250 in FIG. 2) can submit various requests to compliance management service 310 via compliance management interface 310.

Compliance management interface 310 may implement programmatic interface 430, which may include an Application Programming Interface (API), in some embodiments to perform various actions on behalf clients 400 and other components, such as compliance assessment agents 412 and external compliance assessor(s) 420. Similarly, compliance management interface 310 may implement a management console 440 via which different user interfaces, such as query user interface 442, compliance type user interface 444 and compliance scheme user interface 446, may be implemented.

Client(s) 400 may submit requests to create, update, delete, or apply a compliance scheme, in various embodiments 450. For example, the creation request may identify a compliance type to associate with a compliance scheme, as well as various features, conditions, criteria, or other information that describe what and how compliance is to be assessed with respect to the compliance scheme. For example, a patch baseline compliance scheme may be created which defines a minimal set of patches or updates that have to be applied at a resource in order for the resource to be compliant with the compliant scheme.

Client(s) 400 may also submit requests to create, update, or delete compliance types 460, in some embodiments. For example, creation requests 460 may identify a name for a compliance type, other compliance type descriptive information, such as the compliance assessors that may be invoked in order to assess compliance of compliance schemes associated with the compliance type, in some embodiments. As discussed below with regard to FIGS. 7-9, in some embodiments creation of compliance types may include storing a compliance scheme to generate compliance state information. Creation of compliance types may allow for the creation of custom compliance state to be supplied by different kinds of resources (including resources which may be only monitored or assessed for compliance via external or third-party compliance assessors). Compliance types can be extended, in various embodiments, to cover the collection or grouping of compliance schemes that may be desirable for viewing with respect to one or multiple user accounts, particular roles or permission lists without exposing more sensitive or more detailed information to certain users, in some embodiments.

Client(s) 400 may also submit compliance state queries 460 and receive responses 470 via compliance management interface 310, as discussed in more detail below with regard to FIGS. 5 and 7-9. Compliance management interface 310 may also allow compliance assessment agents 412 implemented on computing resources 410 to submit assessment reports 414 directly to compliance management system for storage and compliance state generation, in some embodiments. Similarly, external compliance assessor(s) 420, which may not implement intermediary compliance assessment agents, may provide compliance assessments 424 to compliance management service 270 via compliance management interface 310. Assessments 512 and 524 may overwrite previous assessments for the resources, in some embodiments, to prevent the need to distinguish between current and past assessment history. In other embodiments, resource assessment versioning may be maintained.

Client(s) 400 may submit requests to export compliance state 480 via compliance management interface 310, in some embodiments. For example, the export request may include features to identify an export location (e.g., another data store or service within provider network 200), access credentials or other information to access the export location, a request to change the compliance state format (e.g., converting a JSON document into a relational data object) and/or perform encoding techniques on the exported data (e.g., encryption and/or compression), in some embodiments.

Client(s) 400 may submit requests to create, update, or delete reporting events 490 via compliance management interface 310, in some embodiments. For example, reporting events may trigger the storage of compliance state information as part of a change tracking or historical data store for compliance state, in one embodiment. In another embodiment, a reporting event may trigger the reporting of some compliance state to be used to perform remediation operations (e.g., by identifying a resource, condition, state or criteria of the resource that is not compliant, and the remedial action, operation, or function that can be performed to cure the non-compliant resource), as discussed below with regard to FIG. 9.

Figure 5:
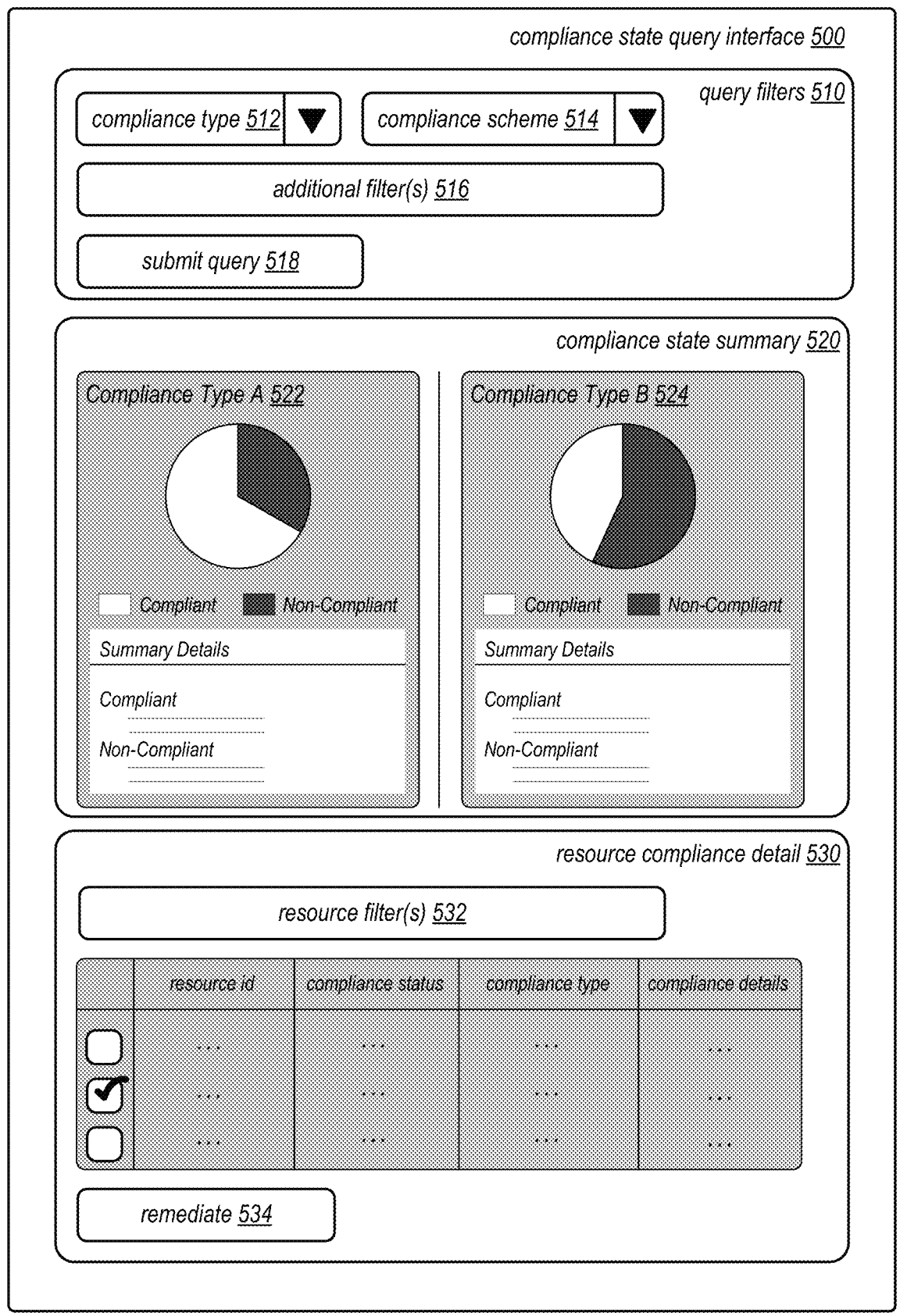
FIG. 5 is a query user interface for compliance state generated by a compliance management service, according to some embodiments.

FIG. 5 is a query user interface for compliance state generated by a compliance management service, according to some embodiments. Compliance state query interface 500 may be an example of a query user interface 442 as discussed above with regard to FIG. 4. Compliance state query interface 500 may implement one or more user interface elements to display controls for submitting queries to compliance state(s) and receiving query responses. In some embodiments, compliance state query interface 500 may implement query filters 510 which include user interface elements to select one (or more) compliance types 512, one (or more) compliance schemes 514 associated with the selected compliance types, and additional filters which may further refine the query based on various other predicates or criteria, such as resource type, non-compliance severity, etc.). User interface element 518 may allow a user to submit a query. In some embodiments, the selections or inputs of query filter elements 512, 514, and 516 may automatically trigger the generation of query results which may be displayed in other user interface elements of compliance state query interface 500, such as compliance state summary 520 and resource compliance detail 530.

In some embodiments, compliance query state interface 500 may implement compliance state summary 520. Compliance state summary 520 may display various requested compliance sate according to query filters 510. For example, if multiple compliance states are selected, then as illustrated in FIG. 5, different compliance type summaries may be provided, such as compliance type A summary 522 and compliance type B summary 524. The same or different summary details may be displayed (e.g., based on the schema of the compliance type), in some embodiments.

In some embodiments, compliance query state interface 500 may implement resource compliance detail 530, which may provide a list of computing resources included in the compliance type summaries selected in query filters 510. In this way, the individual resources compliance information (and/or other resource information, such as resource configuration information) may be evaluated in along with or in addition to the aggregated or analyzed information presented in the summaries 520. In some embodiments resource compliance detail 530 may implement resource filter(s) 532 to provide a user interface element to implement additional filters or other criteria to retrieve compliance state with respect to individual resources. For example, resource filter(s) 532 may search or filter by resource id, resource tag, compliance type, or compliance status, in some embodiments.

In some embodiments, compliance state query interface 500 may implement user interface elements to remediate or otherwise correct non-compliant resources, such as remediate element 534. A resource may be selected according to a user interface element (e.g., the selection box with the checkmark illustrated in FIG. 5). Then, the appropriate remedial action to make the resource compliant may be identified (e.g., according to the compliance scheme or enforcement/application mechanisms implemented by compliance scheme assessors, 330 or 360 in FIG. 3, in one embodiment. For example, software patch installation scripts can be executed or configuration documents applied to change the configuration of the selected resource.

Figure 6:
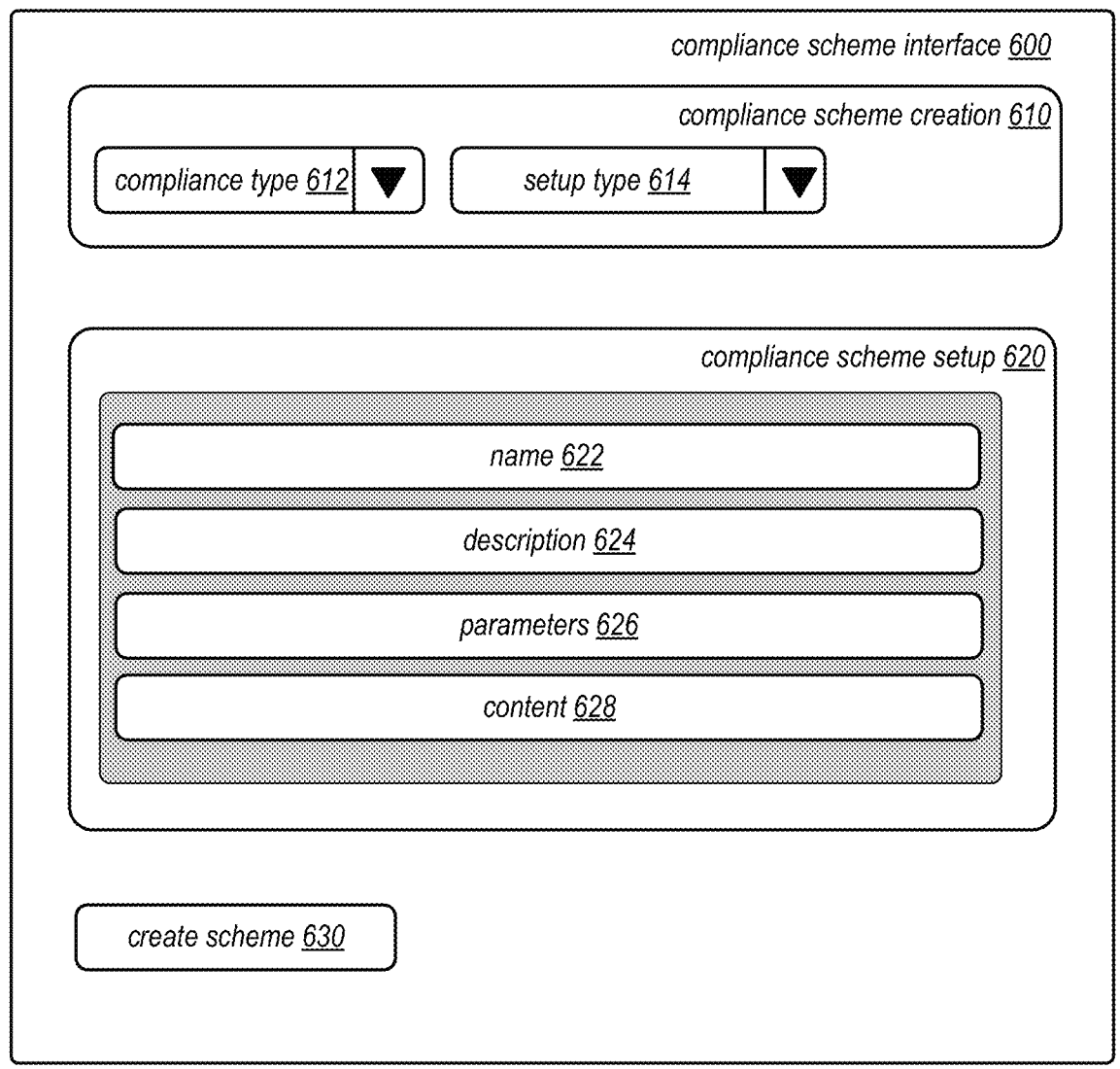
FIG. 6 is a compliance scheme user interface for creating compliance schemes associated with a compliance type, according to some embodiments.

FIG. 6 is a compliance scheme user interface for creating compliance schemes associated with a compliance type, according to some embodiments. Compliance scheme interface 600 may be similar to compliance scheme user interface 446 in FIG. 4. Compliance scheme interface 600 may implement features to create, modify, or delete compliance schemes. For example, compliance scheme interface 600 may implement compliance scheme creation element 610, which may provide users with the ability to associate the compliance scheme with a compliance type 612 and setup type 614. For example, a setup type 614 may identify the compliance assessor and/or type of assessment mechanism within the assessor to perform various compliance functions for the resources, as discussed above with regard to FIG. 4.

Compliance scheme interface 600 may implement compliance scheme setup 620 according to the selected creation features 612 and 614. In some embodiments, compliance scheme setup 620 may be implemented as a separate window, screen, or other user interface area. Different compliance schemes may utilize different information in order to apply the compliance scheme to resources. For example, one compliance scheme setup may include user interface elements to enter a name 622, description 624, parameters 626, and/or content 638 for the compliance scheme. Name 622 may a unique (or unique within a user account) name for the compliance scheme, in some embodiments. Description 624 may be a short text description of the compliance scheme (e.g., purpose, goals, actions taken, etc.), in some embodiments. Parameters 626 may be the resource specific values assessed at each resource, in some embodiments. Content 628 may be the rules, evaluations, or other actions performed to determine whether a resource complies with a compliance scheme, in some embodiments. Please note that various other compliance setup interfaces and information may be implemented in order to create compliance schemes and therefore the previous examples are not intended to be limiting. Once finalized, crate scheme user interface element 630 may be selected to submit the request to create the client scheme, which may allow for computing resources to be assigned, associated with, or monitored for compliance with respect to the compliance scheme.

Figure 7:
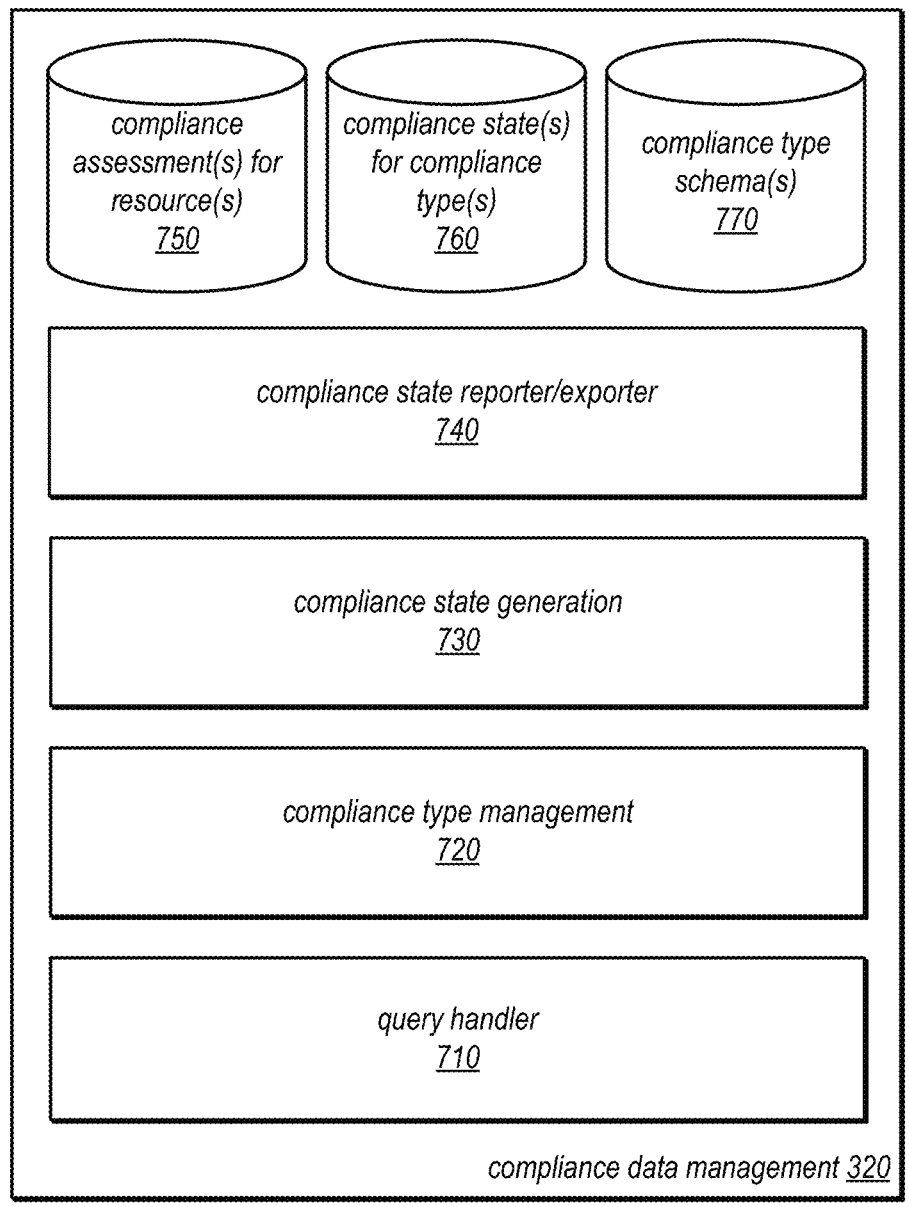
FIG. 7 is a logical block diagram illustrating a compliance data manager, according to some embodiments.

FIG. 7 is a logical block diagram illustrating a compliance data manager, according to some embodiments. In at least some embodiments, compliance data management 320 may implement a query handler 710 to process queries for compliance state receive via interface 310. As discussed above with regard to FIGS. 4 and 5, different types of queries may be received that are directed to one or multiple compliance types, one or multiple compliance schemes associated with the compliance types, and as well as other filter, predicates, or criteria indicating desired compliance state to return in response to the query, in one embodiment. Query handler 710 may parse queries to identify the different features needed to process the query including recognizing the indicated compliance types, compliance schemes, and other filters, predicates, or other criteria. Query handler 710 may check queries for validity (e.g., by determining whether the supplied values for the compliance types, compliance schemes, and/or other filters, predicates or other criteria are exist or are erroneous). In at least some embodiments, query handler 710 may enforce user or role restrictions. For example, a query may be submitted by or associated with a user that has a role or privileges allowing access to some compliance types, but not others. In such a scenario, query handler 710 may deny or reject any queries directed to compliance types for which the user or role does not have permission to access.

Compliance state(s) for compliance type(s) 760 may be stored in different data formats or types of data stores. Key value stores, relational or non-relational data stores, in-memory databases, index stores, hierarchical stores, document stores, indexed stores or other data stores may store compliance state(s) for compliance type(s). In at least one embodiment, compliance state(s) for compliance type(s) 760 may be stored in document based store that stores the compliance states as Javascript Objection Notation (JSON) or other human readable text documents which may be searched in order to perform queries using a full text search engine. Whether searched according to a full text search engine or other data scanning, filtering, indexing, or retrieving technologies (e.g., an ACID compliant relational database), query handler 710 may generate the appropriate request to access compliance state(s) 760 in order to perform the query. Query handler 710 may then format and return the result (e.g., according to a same or different interface via which the request was received or store the results in a specified result storage location), in some embodiments.

Compliance data management 320 may implement compliance type management 720, in some embodiments, to maintain compliance types for association with compliance schemes. For instance, compliance type management may handle compliance type creation requests, storing and/or generating a schema for the compliance type in compliance type schema(s) 770, in some embodiments. Similarly, compliance type management may update or delete the compliance type, correspondingly performed updates to the data store maintaining compliance type schema(s) 770. In some embodiments, compliance type management 720 may implement versioning for compliance types, tracking changes to the schema for a compliance type, maintaining a history of or prior version of compliance type schemas (e.g., in the event that associations between a compliance schema and an older compliance type are not broken by introducing a new version of a compliance type. Compliance type management 720 may validate submitted schemas for compliance type (e.g., checking for required fields, data, values, data formats (e.g., is the schema in JSON or XML), in some embodiments.

Compliance data management 320 may implement compliance state generation 730, in some embodiments, to generate compliance state for different compliance type(s). Compliance state generation 730 may detect triggering events or conditions to generate compliance state. For example, the arrival of assessments of computing resources may be compared with known compliance types, and trigger events to generate compliance state for the identified compliance types, in one embodiment. Compliance state generation 730 may perform batch processing on assessments for respective compliance types, so that after a threshold number of assessments are received (or amount of assessment data received), compliance state generation may be performed, in one embodiment.

Compliance state generation 730 may handle the arrival of compliance assessments, in some embodiments, by storing the assessments in compliance assessment(s) for resource(s) 750 store until compliance state generation is performed. Storage for compliance assessment(s) for resource(s) 750 may be a data store similar to compliance type schema(s) 770, in some embodiments, (e.g., a key value data store, database, or other data store different from that which stores compliance state(s) 760), or a same data store that stores compliance state(s) 760).

To generate compliance state for a compliance type, compliance state generation 730 may access a corresponding compliance type schema 770 for the compliance state being generated, in some embodiments. For example, a compliance type schema 770 may identify which data values to extract from assessments for computing resources for the compliance type, the calculations, transformations, or statistical analysis to be performed for them, and how to group, arrange, display, or interpret the results. Consider a schema that identifies the types or degrees of non-compliance for different resources for an individual compliance scheme associated with a compliance type or across all compliance schemes for the compliance type as a whole. In such a schema, non-compliance may be sorted into different severity categories, such as "Critical," "High," "Medium," and "Low." In some embodiments, a schema may instruct the generation of compliance state that breaks out compliance data into different views or granularities which may be provided in response to different query filters, predicates, or criteria. Once generated, compliance state may be stored in compliance state(s) for compliance type(s) 760.

In some embodiments, compliance data management 320 may implement compliance state reporter/exporter 740 to send compliance state to other locations. For example, an export request may be received and handled by compliance state exporter 740 to identify an export location (e.g., another data store or service within provider network 200), and perform an operation to send a copy or portion of an identified compliance state to the export location. In some embodiments compliance state reporter/exporter 740, may change the compliance state format (e.g., converting a JSON document into a relational data object) and/or perform encoding techniques on the exported data (e.g., encryption and/or compression).

In some embodiments, compliance state reporter/exporter 740 may evaluate the generation of compliance state to detect reporting events (e.g., based on the content of compliance state or the act of generating compliance state for a particular compliance type). For example, a reporting rule or event may be created, configured, and/or evaluated by compliance state reporter/exporter 740 to recognize that if compliance state for compliance type A exceeds a non-compliance threshold above 50% then a reporting notification that includes the compliance state for compliance type A may be sent to another service (e.g., which may trigger remedial or other responsive actions), in one embodiment.

Figure 8:
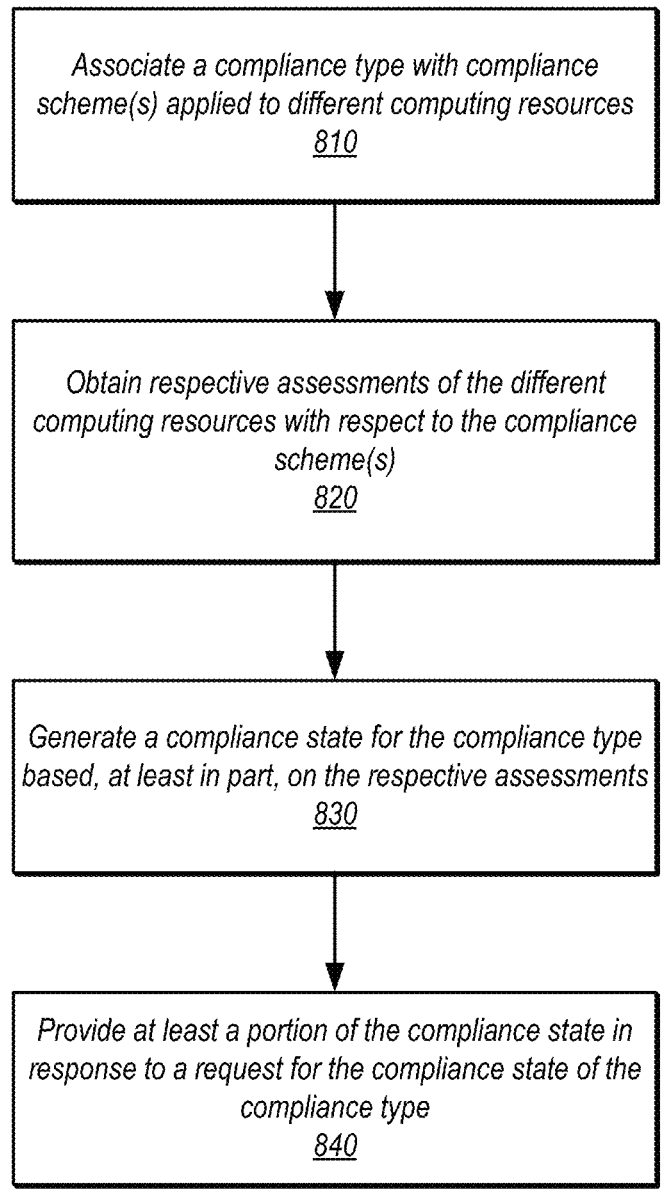
FIG. 8 is a high-level flowchart illustrating various methods and techniques to implement extensible resource compliance management, according to some embodiments.

Although FIGS. 2-7 have been described and illustrated in the context of a provider network implementing a compliance management service, the various components illustrated and described in FIGS. 2-7 may be easily applied to other management techniques, systems, or devices that assess and/or otherwise manage the compliance of computing resources with respect to compliance schemes. As such, FIGS. 2-7 are not intended to be limiting as to other embodiments of a system that may implement extensible resources compliance management. FIG. 8 is a high-level flowchart illustrating various methods and techniques to implement extensible resource compliance management, according to some embodiments. Various different systems and devices may implement the various methods and techniques described below, either singly or working together. For example, a compliance management service and/or components within other services in a provider network such as described above with regard to FIGS. 2-7 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, a compliance type may be associated with compliance scheme(s) applied to different computing resources, in various embodiments. A compliance type may identify, link, or otherwise indicate a grouping or collection of compliance schemes for a particular system, user account, other computing resources assessed for compliance with respect to the compliance schemes. Association of a compliance type with compliance scheme(s) may be performed as part of the creation or modification of a compliance scheme, in one embodiment, by storing an indication of the compliance type as part of a compliance scheme definition or other schema information for the compliance scheme. In one embodiment, the compliance scheme may be associated with the compliance type in mapping information or other data that links, points, or otherwise maps compliance types to compliance schemes (e.g., in a table that maintains a compliance type information) in response to a notification of the creation of the compliance scheme or upon receiving an assessment of a computing resource that indicates that a compliance scheme is mapped to the compliance type.

As indicated at 820, respective assessments of the different computing resources with respect to the compliance scheme(s) may be obtained, in various embodiments. For example, as discussed above with respect to FIG. 4, agents or other components may push out compliance assessments determined with respect to a compliance scheme as the compliance assessments are performed in order. In some embodiments, polling techniques to track and request compliance assessments may be performed in order to initiate compliance assessments and/or the reporting of the assessments.

As indicated at 830, a compliance state for the compliance type may be generated based, at least in part, on the respective assessments, in some embodiments. The compliance state may include those computing resources to which the compliance scheme(s) apply (whether the compliance schemes are separately applicable to different computing resources or applicable to some or all of the same resources), in some embodiments. The generation of the compliance state may include scanning, parsing, or otherwise filtering the assessments to provide an aggregated, combined, manipulated, analyzed, or otherwise transformed state of compliance with respect to the compliance type. For example, the compliance state may aggregate and provide a number of compliant resources and non-compliant resources, in one embodiment. The compliance state may further divide compliance state into sub-categories of compliance and non-compliance (e.g., by individual compliance scheme, by scoring, scaling or otherwise indicating how far from compliance sub-groups of resources), in some embodiments. As discussed below with regard to FIG. 9, compliance state may be generated according to a schema for the compliance type indicating the analyses, statistics, arrangement, formatting, reporting, publishing, or other responsive actions to take with respect to the assessments and compliance state for a compliance type, in some embodiments.

As indicated at 840, at least a portion of the compliance state may be provided in response to a request for the compliance state, in some embodiments. For example, different queries that specify the compliance type, compliance schemes thereof, and other filters, predicates, or other criteria may be received that are directed to the compliance state, in some embodiments. The filters, predicates, and/or other criteria may be applied, along with the specified compliance type and schemes to retrieve the desired portion of the compliance state, in some embodiments. In some embodiments, valid query criteria, predicates, or filters may be specified according to the schema for the compliance type. Other requests to view or retrieve the entire compliance state may, in some embodiments be received.

Figure 9:
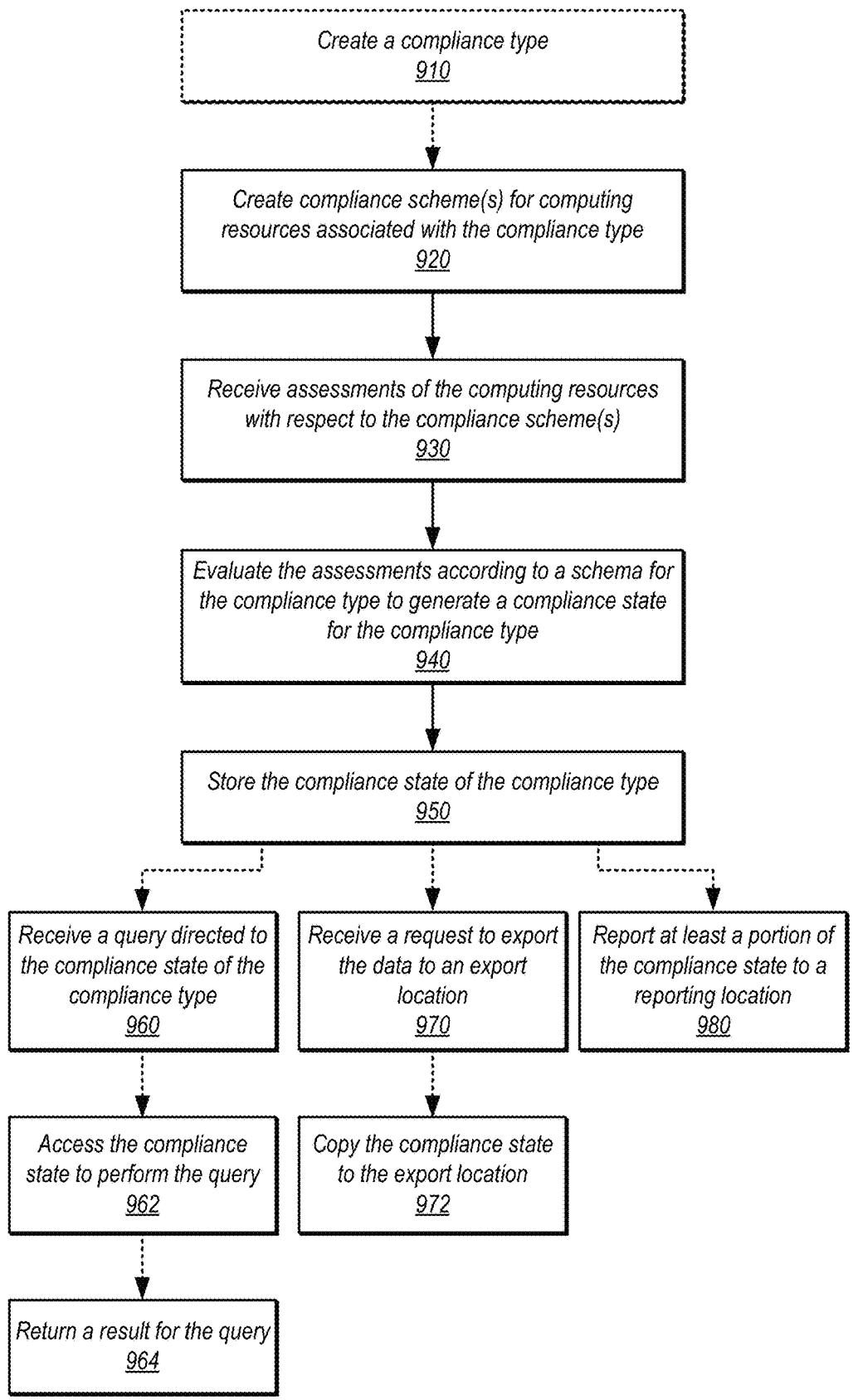
FIG. 9 is a high-level flowchart illustrating various methods and techniques to generate and provide access to compliance state for compliance types, according to some embodiments.

Different compliance types may be created, modified, or otherwise maintained for different compliance schemes or computing resources, in various embodiments. Different compliance types may summarize or provide for different resulting compliance states (e.g., not only being associated with different compliance schemes but may also provide different analyses, statistics, or responsive actions depending on the compliance type). FIG. 9 is a high-level flowchart illustrating various methods and techniques to generate and provide access to compliance state for compliance types, according to some embodiments. As indicated at 910, a compliance type may be created, in some embodiments. For example, a request, as discussed above with regard to FIG. 4, or other triggering event for the creation of a compliance type may be detected, in one embodiment.

The creation of the compliance type may include the creation of a schema for the compliance type. For example, the schema may be defined according to a human-readable scripting language such as Javascript Object Notation (JSON) or Extensible Markup Language (XML), in some embodiments, and be sent along with a compliance type creation request or as part of a separate transfer communication. In some embodiments a user interface (not illustrated) may be provided with a series of questions, steps, or user interface elements that a guide a user through the creation of a compliance type by generating a schema for the compliance type based on user input to the user interface. The schema may include features such as the name of the compliance type, the compliance assessors or types of assessors that apply compliance schemes that can be associated with the compliance type, description of the compliance type, a version number (e.g., if compliance type versioning is maintained), filters, criteria, or other predicates for querying compliance state (e.g., providing a structure for compliance state, such as a table structure with column names, values, and data types), sub-groups or sub-features that may be determined from assessments of resources with associated compliance schemes (e.g., compliance scores, ratings, or severity indications), links, pointers, or other associations with remedial or other responsive actions that may be performed with respect to resources of a compliance type (e.g., such as links to commands, scripts, executables, service or system invocations, or other mechanisms for modify a resource to become compliant with a compliance scheme or handle the non-compliance of the resource, which may include redirecting work or requests away from the resource, shutting down the resource, modifying security or network settings for the resource, etc.).

As indicated at 920, compliance scheme(s) may be created for computing resources associated with the compliance type, in some embodiments. Compliance scheme(s) may be created according to the compliance assessor that applies, enforces, and/or assesses the compliance schemes. A compliance scheme that ensures the application of software patches to different software operating on or as part of a computing resource may be applied and assessed by an update manager, such as resource update management 350 in FIG. 3 above. Thus the compliance scheme for the software patches may be created according to an interface, criteria, or other information provided to the resource update manager, in some embodiments. As part of creating the compliance scheme, the compliance scheme may be associated with the compliance type (created above or a pre-defined/default compliance type), in some embodiments, by including a compliance type identifier or other link in the compliance scheme. Consider the software patch example given above. The compliance scheme for the software patch may be defined or enforced according to a compliance document or policy, which may include among other information describing the software patch application, an identifier for the compliance type to which the compliance scheme is linked, in one embodiment.

As indicated at 930, assessments of the computing resources with respect to the compliance schemes may be received, in some embodiments. Similar to the discussion above with regard to FIG. 8, agents or other components may push out compliance assessments determined with respect to a compliance scheme as the compliance assessments are performed in order. In some embodiments, polling techniques to track and request compliance assessments may be performed in order to initiate compliance assessments and/or the reporting of the assessments.

As indicated at 940, the assessments may be evaluated according to a schema for the compliance type to generate a compliance state for the compliance type. In some embodiments, compliance state generation may be a rolling or streaming process that generates compliance state as the assessments are received. For instance, each time an assessment is received, the compliance state may be updated. In some embodiments, the compliance state may be updated according to a schedule, or in response to a request (e.g., an admin command invoked via an interface or a query request).

As there may be multiple compliance types, a schema for the compliance type for which the compliance state is being generated may be identified and retrieved (e.g., from compliance type schema(s) store 770 in FIG. 7 above). The schema may provide a blue print or execution plan to parse the assessments, extract information to generate the state, and perform statistical analyses (e.g., averaging, summing, standard deviation, quantile summary, etc.) with respect to the extracted information. Compliance state may be stored in various kinds of data structures, including hierarchical data structures that may provide varying levels of information detail according to the type of query or request for compliance state (e.g., a first tier or root structure that provides high-level analysis for the entire set of resources, then lower tier structures in the hierarchy that provide analysis and information for different sub groups.

As indicated at 950, the compliance state of the compliance type may be stored, in some embodiments. For example, a data store, such as a database or other searchable data store may be accessed and updated to include the compliance state (or updates to the compliance state). As discussed above with regard to FIG. 7, the compliance state may be maintained as un-structured or semi-structured collections of one or more data (e.g., records) that are indexed for text-based searching (e.g., using searching and indexing techniques like Apache Lucene or other full text search engines), in some embodiments. Therefore, the stored compliance state may be stored in a format or location that conforms to full text search engines. In other embodiments, relational database or other structured or semi-structured data processing techniques, including No SQL or non-relational data stores) may be used to store and provide access to compliance state of the compliance type.

Compliance state information may be provided in response to different types of requests, conditions, events, or scenarios. For example, as indicated at 960, a query may be received that is direct to the compliance state of the compliance type, in one embodiment. The query may be submitted via text-based or command line interface utilizing an API or may be received according to a graphical user interface, such as discussed above with regard to FIG. 5. The query may be directed to the compliance state of more than one compliance type, in some embodiments. For example, the query may be directed both a patch compliance type and a resource state compliance type in order to provide a summary of compliance for the resources associated with a user account, entity, system, or service, in one embodiment. Queries may include filters, predicates, or other criteria to indicate the desired data to be returned and, in some embodiments, the desired format of the returned data. For example, filters may include compliance scheme and/resource information (e.g., resource types, compliance scheme descriptive information, etc.) or time information (e.g., return compliance state based on assessments within a particular window of time).

As indicated at 962, the compliance state may be accessed to perform the query in some embodiments. If, for instance, the compliance state is stored in a database system, then a SQL or other database query may be generated and performed based on the received query to return the desired compliance state. If, as discussed above, full-text search engine is utilized, then text search key words or other identifiers may be identified and included in a text search query that is performed with respect to the indexed compliance state for compliance types maintained in the data store, in one embodiment. A result may be returned for the query, as indicated at 964, in some embodiments. For example, the query results may be returned via the same interface through with the query was received, reported to another service or location, or stored in an identified storage location for subsequent access (e.g., by a client), in one embodiment In some embodiments, compliance state information can be provided as input to other analytical tools, monitoring tools, or other data processing platforms for further processing and analysis. For example, as indicated at 970, a request may be received to export the data to an export location, in some embodiments. A request to export data may include a network endpoint, a data format, access credential and any other information needed to fulfill the export request. As indicated at 972, the compliance state (or a requested form thereof) may be copied to the export location, in some embodiments. For example, file transfer protocols, programmatic requests to another data store service to write copies of the compliance state, or other physical or logical copying mechanisms may be performed, in some embodiments.

Another example of providing compliance information may include reporting at least a portion of the compliance state to a reporting location, in some embodiments. For example, compliance stage generation and/or storage may be triggering events to report the new or updated compliance state to a monitoring mechanism, which may alarm or perform responsive actions based on the reported compliance state information, in some embodiments. Similar to the export request above, information to perform reporting, including a network endpoint, a data format, and access credential, may be maintained as part of a reporting mechanism to send the portion of compliance state to the desired reporting location. In some embodiments, multiple reporting locations (e.g., at different services) may receive different or the same portions of the compliance data for further analysis or processing (e.g., a service to track the change history of compliance data and a monitoring service to alarm upon conditions triggered by compliance data).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
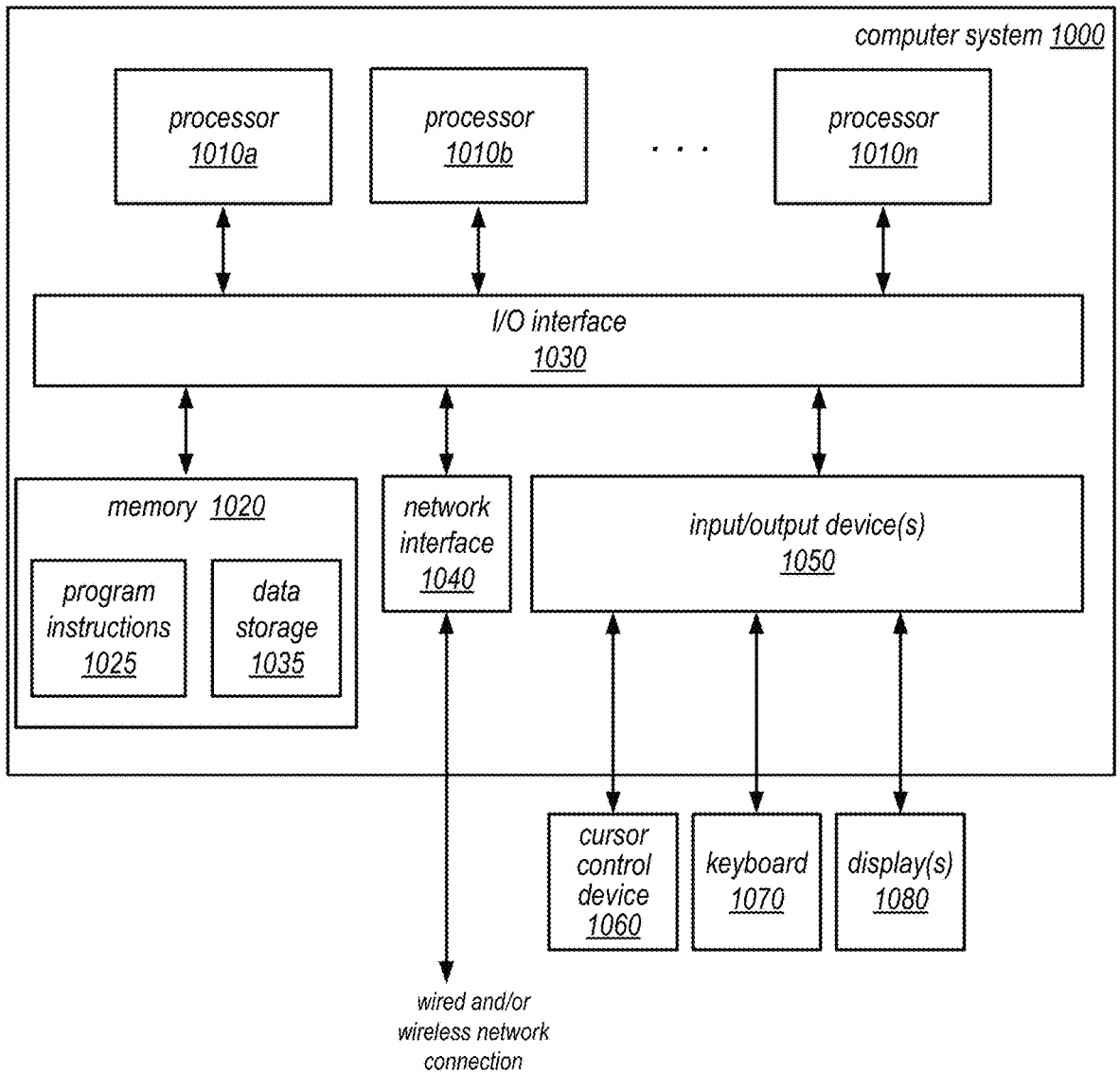
FIG. 10 illustrates an example system configured to implement the various methods, techniques, and systems described herein, according to some embodiments.

Embodiments of an extensible resource compliance management as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   a memory, that stores program instructions, and that when executed by the one or more processors, cause the one or more processors to implement a compliance management service, wherein the compliance management service is configured to:
      monitor a collection of computing resources, implemented at one or more services of a provider network, to detect one or more events that trigger evaluation of the collection of computing resources with respect to a plurality of different compliance schemes applicable to the collection of computing resources, wherein at least one computing resource of the collection of computing resources is located in a different geographical region than a further one computing resource of the collection of computing resources;
      receive, via an interface of the compliance management service, a selection of a compliance type out of a plurality of compliance types evaluated by the compliance management service, wherein the selected compliance type aggregates one or more compliance schemes of the plurality of different compliance schemes applicable to respective one or more computing resources of the collection of computing resources including the at least one computing resource of the collection of computing resources located in the different geographical region;
      access a compliance state generated for the selected compliance type based on respective assessments of the respective one or more computing resources of the collection of computing resources including the at least one computing resource of the collection of computing resources located in the different geographical region with respect to the one or more compliance schemes of the plurality of different compliance schemes, wherein a schema identified for the selected compliance type provides one or more instructions to aggregate individual results of the respective assessments of the respective one or more computing resources of the collection of computing resources including the at least one computing resource of the collection of computing resources located in the different geographical region;

based on the accessed compliance state for the selected compliance type, generate a compliance state summary for the selected compliance type;

provide, via the interface of the compliance management service, the compliance state summary for the selected compliance type and respective compliance details for individual computing resources of the collection of computing resources including respective compliance details for the at least one computing resource of the collection of computing resources located in the different geographical region; and perform a remedial action to correct a non-compliant computing resource of the collection of computing resources identified in the compliance state summary for the selected compliance type.

2. The system of claim 1, wherein the compliance state summary for the selected compliance type is displayed according to one or more selections received via different user interface elements of the interface of the compliance management service.

3. The system of claim 2, wherein the one or more selections of a compliance type out of a plurality of compliance types excludes compliant computing resources from the compliance state summary for the selected compliance type.

4. The system of claim 1, wherein the compliance management service is further configured to:

receive, via the interface of the compliance management service, a request to perform the remedial action to correct the non-compliant computing resource of the collection of computing resources identified in the compliance state summary for the selected compliance type; and in response to the request, perform the remedial action to correct the non-compliant computing resource of the collection of computing resources identified in the compliance state summary for the selected compliance type.

5. The system of claim 1, wherein the compliance management service is further configured to detect an event that triggers the generation of the compliance state for the selected compliance type for one computing resource of the collection of computing resources.

6. The system of claim 1, wherein respective compliance state for the collection of computing resources used to generate the compliance state summary for the selected compliance type is updated according to a schedule.

7. The system of claim 1, wherein the individual computing resources of the collection of computing resources are compute instances hosted as part of a provider network that implements the compliance management service.

8. A method, comprising:

monitoring, by a compliance management service, a collection of computing resources, implemented at one or more services of a provider network, to detect one or more events that trigger evaluation of the collection of computing resources with respect to a plurality of different compliance schemes applicable to the collection of computing resources, wherein at least one computing resource of the collection of computing resources is located in a different geographical region than a further one computing resource of the collection of computing resources;

receiving, via an interface of the compliance management service, a selection of a compliance type out of a plurality of compliance types evaluated by the compliance management service, wherein the selected compliance type aggregates one or more compliance schemes of the plurality of different compliance schemes applicable to respective one or more computing resources of the collection of computing resources including the at least one computing resource of the collection of computing resources located in the different geographical region;

accessing, by the compliance management service, a compliance state generated for the selected compliance type based on respective assessments of the respective one or more computing resources of the collection of computing resources including the at least one computing resource of the collection of computing resources located in the different geographical region with respect to the one or more compliance schemes of the plurality of different compliance schemes, wherein a schema identified for the selected compliance type provides one or more instructions to aggregate individual results of the respective assessments of the respective one or more computing resources of the collection of computing resources including the at least one computing resource of the collection of computing resources located in the different geographical region;

based on the accessed compliance state for the selected compliance type, generating, by the compliance management service, a compliance state summary for the selected compliance type;

providing, via the interface of the compliance management service, the compliance state summary for the selected compliance type and respective compliance details for individual computing resources of the collection of computing resources including respective compliance details for the at least one computing resource of the collection of computing resources located in the different geographical region; and performing, by the compliance management service, a remedial action to correct a non-compliant computing resource of the collection of computing resources identified in the compliance state summary for the selected compliance type.

9. The method of claim 8, wherein the compliance state summary for the selected compliance type is displayed according to one or more selections received via different user interface elements of the interface of the compliance management service.

10. The method of claim 9, wherein the one or more selections exclude compliant computing resources from the compliance state summary for the selected compliance type.

11. The method of claim 8, further comprising:

receiving, via the interface of the compliance management service, a request to perform the remedial action to correct the non-compliant computing resource of the collection of computing resources identified in the compliance state summary for the selected compliance type; and in response to the request, performing, by the compliance management service, the remedial action to correct the non-compliant computing resource of the collection of computing resources identified in the compliance state summary for the selected compliance type.

12. The method of claim 8, further comprising detecting, by the compliance management service, an event that triggers generation of the respective compliance details for one computing resource of the collection of computing resources.

13. The method of claim 8, wherein respective compliance state for the collection of computing resources used to generate the compliance state summary for the selected compliance type is updated according to a schedule.

14. The method of claim 8, wherein the individual computing resources of the collection of computing resources are compute instances hosted as part of a provider network that implements the compliance management service.

15. One or more non-transitory computer-readable storage media storing program instructions that, when executed on or across one or more processors, cause the one or more processors to:
monitor, by a compliance management service, a collection of computing resources, implemented at one or more services of a provider network, to detect one or more events that trigger evaluation of the collection of computing resources with respect to a plurality of different compliance schemes applicable to the collection of computing resources, wherein at least one computing resource of the collection of computing resources is located in a different geographical region than a further one computing resource of the collection of computing resources;
receive, via an interface of the compliance management service, a selection of a compliance type out of a plurality of compliance types evaluated by the compliance management service, wherein the selected compliance type aggregates one or more compliance schemes of the plurality of different compliance schemes applicable to respective one or more computing resources of the collection of computing resources including the at least one computing resource of the collection of computing resources located in the different geographical region;
access, by the compliance management service, a compliance state generated for the selected compliance type based on respective assessments of the respective one or more computing resources of the collection of computing resources including the at least one computing resource of the collection of computing resources located in the different geographical region with respect to the one or more compliance schemes of the plurality of different compliance schemes, wherein a schema identified for the selected compliance type provides one or more instructions to aggregate individual results of the respective assessments of the respective one or more computing resources of the collection of computing resources including the at least one computing resource of the collection of computing resources located in the different geographical region;
based on the accessed compliance state for the selected compliance type, generate, by the compliance management service, a compliance state summary for the selected compliance type;
provide, via the interface of the compliance management service, the compliance state summary for the selected compliance type and respective compliance details for individual computing resources of the collection of computing resources including respective compliance details for the at least one computing resource of the collection of computing resources located in the different geographical region; and
perform, by the compliance management service, a remedial action to correct a non-compliant computing resource of the collection of computing resources identified in the compliance state summary for the selected compliance type.

16. The one or more non-transitory computer-readable storage media of claim 15, wherein the compliance state summary for the selected compliance type is displayed according to one or more selections received via different user interface elements of the interface of the compliance management service.

17. The one or more non-transitory computer-readable storage media of claim 16, wherein the one or more selections exclude compliant computing resources from the compliance state summary for the selected compliance type.

18. The one or more non-transitory computer-readable storage media of claim 15, storing further program instructions that, when executed on or across the one or more processors, cause the one or more processors to further:
receive, via the interface of the compliance management service, a request to perform the remedial action to correct the non-compliant computing resource of the collection of computing resources identified in the compliance state summary for the selected compliance type; and
in response to the request, perform, by the compliance management service, the remedial action to correct the non-compliant computing resource of the collection of computing resources identified in the compliance state summary for the selected compliance type.

19. The one or more non-transitory computer-readable storage media of claim 15, storing further program instructions that, when executed on or across the one or more processors, cause the one or more processors to further detect, by the compliance management service, an event that triggers generation of the respective compliance details for one computing resource of the collection of computing resources.

20. The one or more non-transitory computer-readable storage media of claim 15, wherein the individual computing resources of the collection of computing resources are compute instances hosted as part of a provider network that implements the compliance management service.

* * * * *